US006901521B2

(12) United States Patent
Chauvel et al.

(10) Patent No.: US 6,901,521 B2
(45) Date of Patent: May 31, 2005

(54) DYNAMIC HARDWARE CONTROL FOR ENERGY MANAGEMENT SYSTEMS USING TASK ATTRIBUTES

(75) Inventors: Gerard Chauvel, Antibes (FR); Dominique D'Inverno, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 643 days.

(21) Appl. No.: 09/932,137

(22) Filed: Aug. 17, 2001

(65) Prior Publication Data

US 2002/0055961 A1 May 9, 2002

(30) Foreign Application Priority Data

Aug. 21, 2000 (EP) .............................. 00402331
Oct. 24, 2000 (EP) .............................. 00402945

(51) Int. Cl.[7] .............................................. G06F 1/26
(52) U.S. Cl. ...................... 713/300; 713/320; 713/323; 307/38
(58) Field of Search ................................ 713/300–340; 307/38–40, 64, 66

(56) References Cited

U.S. PATENT DOCUMENTS

| 5,339,445 | A | * | 8/1994 | Gasztonyi ................... 713/324 |
| 5,452,277 | A | * | 9/1995 | Bajorek et al. .......... 369/53.18 |
| 5,557,557 | A | * | 9/1996 | Frantz et al. ................. 703/22 |
| 5,623,647 | A | | 4/1997 | Maitra |
| 5,692,204 | A | * | 11/1997 | Rawson et al. ............. 713/340 |
| 5,719,800 | A | * | 2/1998 | Mittal et al. ................ 713/321 |
| 5,781,783 | A | * | 7/1998 | Gunther et al. ............. 713/320 |
| 5,860,106 | A | * | 1/1999 | Domen et al. .............. 713/324 |
| 5,944,829 | A | * | 8/1999 | Shimoda ...................... 713/324 |
| 5,977,964 | A | * | 11/1999 | Williams et al. ............ 345/721 |
| 5,996,083 | A | * | 11/1999 | Gupta et al. ................ 713/322 |
| 6,076,140 | A | * | 6/2000 | Dhong et al. ............... 711/105 |

(Continued)

FOREIGN PATENT DOCUMENTS

| EP | 0 683 451 A | 11/1995 |
| EP | 0 794 481 A | 9/1997 |

OTHER PUBLICATIONS

R. Young, et al.; *Adaptive Clock Speed Control for Variable Processor Loading*, Motorola Technical Developments, Motorola, Inc., Schaumburg, IL, US, vol. 15, May 1, 1992, pp. 43–44.

(Continued)

*Primary Examiner*—Fritz M. Fleming
(74) *Attorney, Agent, or Firm*—Robert D. Marshall, Jr.; W. James Brady, III; Frederick J. Telecky, Jr.

(57) ABSTRACT

A multiprocessor system (10) includes a plurality of processing modules, such as MPUs (12), DSPs (14), and coprocessors/DMA channels (16). Power management software (38) in conjunction with profiles (36) for the various processing modules and the tasks to executed are used to build scenarios which meet predetermined power objectives, such as providing maximum operation within package thermal constraints or using minimum energy. Actual activities associated with the tasks are monitored during operation to ensure compatibility with the objectives. The allocation of tasks may be changed dynamically to accommodate changes in environmental conditions and changes in the task list. As each task in a scenario is executed, a control word associated with the task can be used to enable/disable circuitry, or to set circuits to an optimum configuration.

12 Claims, 14 Drawing Sheets

U.S. PATENT DOCUMENTS

| | | | |
|---|---|---|---|
| 6,298,448 B1 * | 10/2001 | Shaffer et al. | 713/322 |
| 6,430,693 B2 * | 8/2002 | Lin | 713/322 |
| 6,519,706 B1 * | 2/2003 | Ogoro | 713/322 |
| 6,523,123 B1 * | 2/2003 | Barbee | 713/300 |
| 6,530,027 B1 * | 3/2003 | Morita | 713/322 |
| 6,609,208 B1 * | 8/2003 | Farkas et al. | 713/320 |
| 6,625,737 B1 * | 9/2003 | Kissell | 713/300 |
| 6,625,740 B1 * | 9/2003 | Datar et al. | 713/324 |
| 2002/0042887 A1 * | 4/2002 | Chauvel et al. | 713/300 |
| 2002/0055961 A1 * | 5/2002 | Chauvel et al. | 708/100 |

OTHER PUBLICATIONS

I.A. Manzak, et al.; *Variable Voltage Task Scheduling for Minimizing Energy or Minimizing Power*, 2000 IEEE Int'l Conf. on Acoustics, Speech & Signal, vol. 6, Jun. 5, 2000, pp. 3239–3242.

Texas Instruments Incorporated, U.S. Appl. No. 09/696,052, filed Oct. 25, 2000, *Intelligent Power Management for Distributed Processing Systems*.

* cited by examiner

DYNAMIC HARDWARE CONTROL FOR ENERGY MANAGEMENT SYSTEMS USING TASK ATTRIBUTES

This application claims priority to European Application Serial No. 00402331.3, filed Aug. 21, 2000 and to European Application Serial No. 00402945.0, filed Oct. 24, 2000. U.S. patent application Ser. No. 09/932,651, now U.S. Pat. No. 6,751,705, is incorporated herein by reference.

BACKGROUND OF THE INVENTION

1. Technical Field

This invention relates in general to integrated circuits and, more particularly, to managing energy in a processor.

2. Description of the Related Art

For many years, the focus of processor design, including designs for microprocessor units (MPUs), co-processors and digital signal processors (DSPs), has been to increase the speed and functionality of the processor. Presently, energy consumption has become a serious issue. Importantly, maintaining low energy consumption, without seriously impairing speed and functionality, has moved to the forefront in many designs. Energy consumption has become important in many applications because many systems, such as smart phones, cellular phones, PDAs (personal digital assistants), and handheld computers operate from a relatively small battery. It is desirable to maximize the battery life in these systems, since it is inconvenient to recharge the batteries after short intervals.

Currently, approaches to minimizing energy consumption involve static energy management; i.e., designing circuits which use less energy. In some cases, dynamic actions have been taken, such as reducing clock speeds or disabling circuitry during idle periods.

While these changes have been important, it is necessary to continuously improve energy management, especially in systems where size and, hence, battery size, is important to the convenience of using a device.

In addition to overall energy savings, in a complex processing environment, the ability to dissipate heat from the integrated circuit becomes a factor. An integrated circuit will be designed to dissipate a certain amount of heat. If tasks (application processes) require multiple hardware systems on the integrated circuit to draw high levels of current, it is possible that the circuit will overheat, causing system failure.

In the future, applications executed by integrated circuits will be more complex and will likely involve multiprocessing by multiple processors, including MPUs, DSPs, coprocessors and DMA channels in a single integrated circuit (hereinafter, a "multiprocessor system"). DSPs will evolve to support multiple, concurrent applications, some of which will not be dedicated to a specific DSP platform, but will be loaded from a global network such as the Internet. Accordingly, the tasks that a multiprocessor system will be able to handle without overheating will become uncertain.

Accordingly, a need has arisen for a method and apparatus for managing energy in a circuit without seriously impacting performance.

BRIEF SUMMARY OF THE INVENTION

In the present invention, a processing device is provided including a processing module coupled to one or more associated circuits for supporting the processing module, where the processing module is capable of multitasking multiple tasks. A memory stores a control word for selectively enabling or disabling the associated circuits, wherein each task has an associated control word which is stored in the memory while the task is being executed by the processing module.

The present invention provides significant advantages over the prior art by providing for a fully dynamic energy management. As the tasks executed in the processing system change, circuits that are not needed by the task can be disabled, thereby conserving energy.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–16 of the drawings, like numerals being used for like elements of the various drawings.

Figure 1:
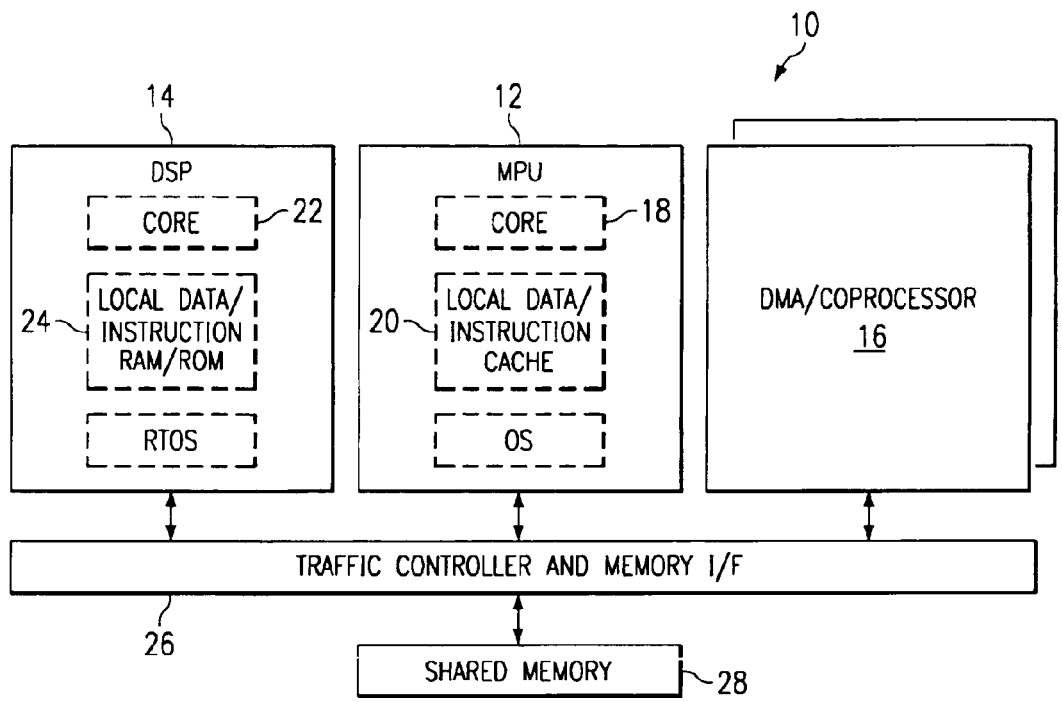
FIG. 1 illustrates a block diagram of a multiprocessor system.

FIG. 1 illustrates a general block diagram of a general multiprocessor system 10, including an MPU 12, one or more DSPs 14 and one or more DMA channels or coprocessors (shown collectively as DMA/Coprocessor 16). In this embodiment, MPU 12 includes a core 18 and a cache 20. The DSP 14 includes a processing core 22 and a local memory 24 (an actual embodiment could use separate instruction and data memories, or could use a unified instruction and data memory). A memory interface 26 couples a shared memory 28 to one or more of the MPU 12, DSP 14 or DMA/Coprocessor 16. Each processor (MPU 12, DSPs 14) can operate in full autonomy under its own operating system (OS) or real-time operating system (RTOS) in a real multiprocessor system, or the MPU 12 can operate the global OS that supervises shared resources and memory environment.

Figure 2:
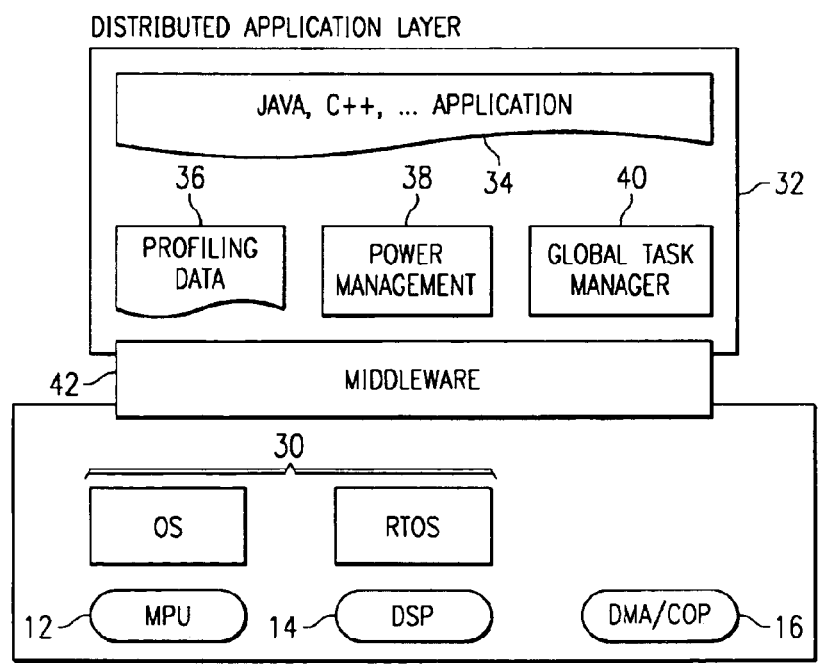
FIG. 2 illustrates a software layer diagram for the multiprocessor system.

FIG. 2 illustrates a software layer diagram for the multiprocessor system 10. As shown in FIG. 1, the MPU 12 executes the OS, while the DSP 14 executes an RTOS. The OS and RTOSs comprise the OS layer 30 of the software. A distributed application layer 32 includes JAVA, C++ and other applications 34, power management tasks 38 which use profiling data 36 and a global tasks scheduler 40. A middleware software layer 42 communicates between the OS layer 30 and the applications in the distributed application layer 32.

Referring to FIGS. 1 and 2, the operation of the multiprocessor system 10 is discussed. The multiprocessor system 10 can execute a variety of tasks. A typical application for the multiprocessor system 10 would be in a smartphone application where the multiprocessor system 10 handles wireless communication, video and audio decompression, and user interface (i.e., LCD update, keyboard decode). In this application, the different embedded systems in the multiprocessor system 10 would be executing multiple tasks of different priorities. Typically, the OS would perform the task scheduling of different tasks to the various embedded systems.

The present invention integrates energy consumption as a criterion in scheduling tasks. In the preferred embodiment, the power management application 38 and profiles 36 from the distributed applications layer 32 are used to build a system scenario, based on probabilistic values, for executing a list of tasks. If the scenario does not meet predetermined criteria, for example if the power consumption is too high, a new scenario is generated. After an acceptable scenario is established, the OS layer monitors the hardware activity to verify that the activity predicted in the scenario was accurate.

The criteria for an acceptable task scheduling scenario could vary depending upon the nature of the device. One important criterion for mobile devices is minimum energy consumption. As stated above, as electronic communication devices are further miniaturized, the smaller battery allocation places a premium on energy consumption. In many cases during the operation of a device, a degraded operating mode for a task may be acceptable in order to reduce power, particularly as the batteries reach low levels. For example, reducing the LCD refresh rate will decrease power, albeit at the expense of picture quality. Another option is to reduce the MIPs (millions of instructions per second) of the multiprocessor system 10 to reduce power, but at the cost of slower performance. The power management software 38 can analyze different scenarios using different combinations of degraded performance to reach acceptable operation of the device.

Another objective in managing power may be to find the highest MIPs, or lowest energy for a given power limit setup.

Figure 3A:
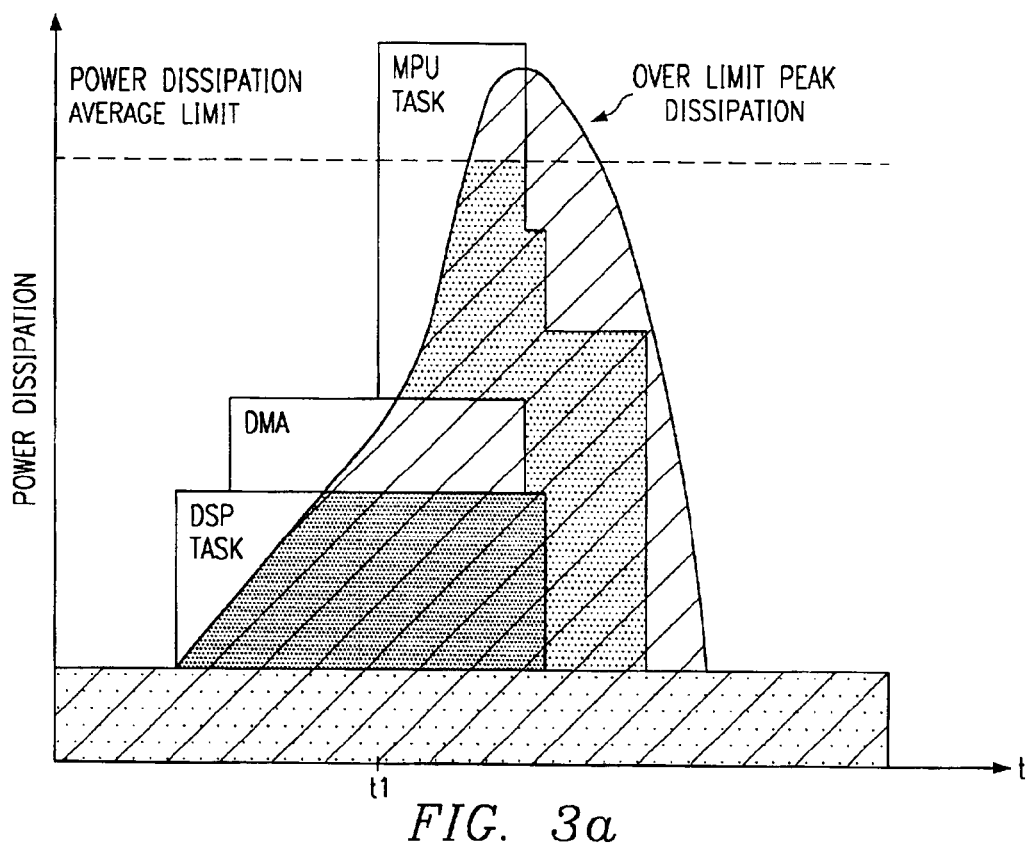
FIG. 3 illustrates an example showing the advantages of energy management for a multiprocessor system.
Figure 3B:
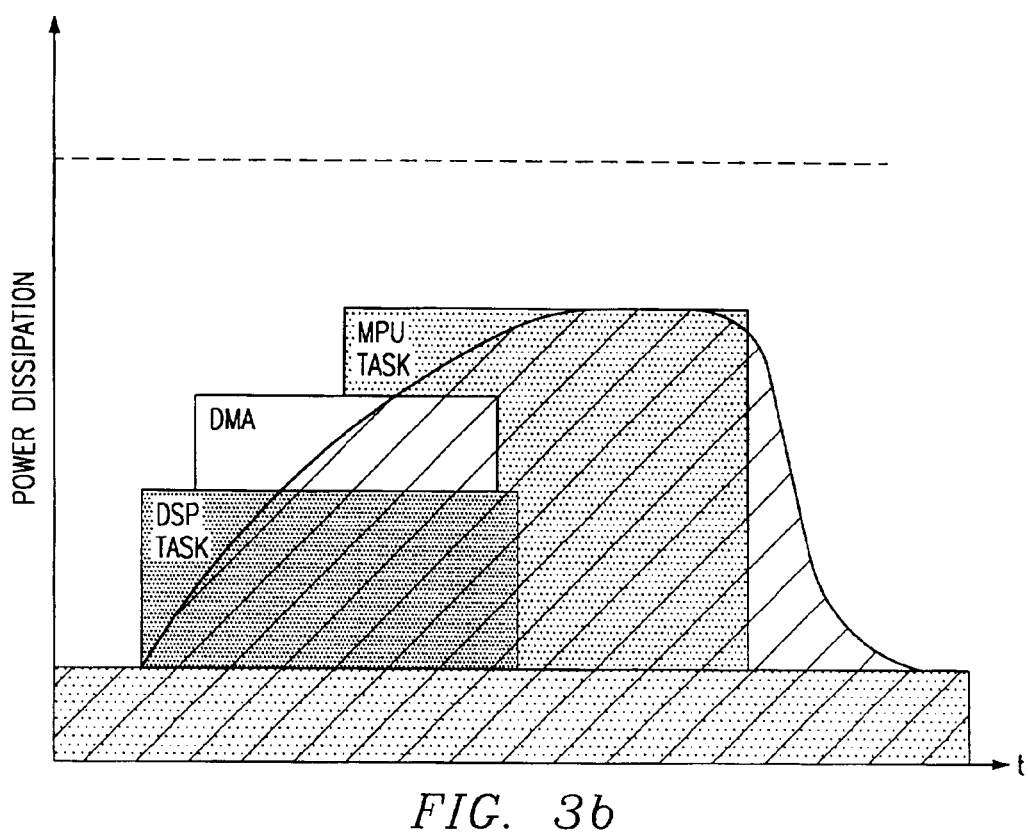

FIGS. 3a and 3b illustrate an example of using the power management application 38 to prevent the multiprocessor system 10 from exceeding an average power dissipation limit. In FIG. 3a, the DSP 14, DMA 16 and MPU 12 are concurrently running a number of tasks. At time t1, the average power dissipation of the three embedded systems exceeds the average limit imposed on the multiprocessor system 10. FIG. 3b illustrates a scenario where the same tasks are executed; however, an MPU task is delayed until after the DMA and DSP tasks are completed in order to maintain an acceptable average power dissipation profile.

Figure 4A:
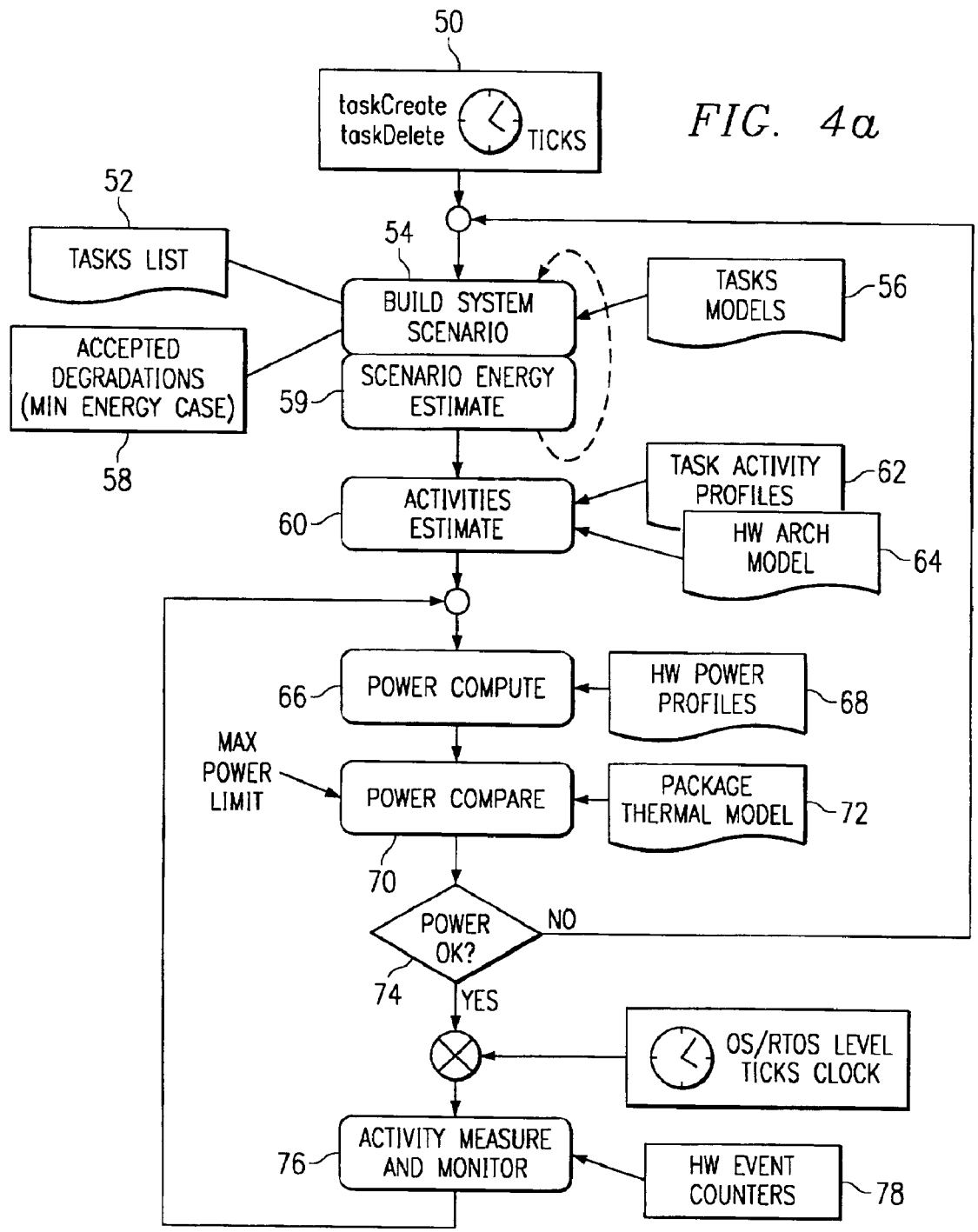
FIGS. 4a and 4b illustrate flow diagrams showing preferred embodiments for the operation of the energy management software of FIG. 2.

FIG. 4a illustrates a flow chart describing operation of a first embodiment of the power management tasks 38. In block 50, the power management tasks are invoked by the global scheduler 40, which could be executed on the MPU 12 or one of the DSPs 14; the scheduler evaluates the upcoming application an splits it into tasks with associated precedence and exclusion rules. The task list 52 could include, for example, audio/video decoding, display control, keyboard control, character recognition, and so on. In step 54, the task list 52 is evaluated in view of the task model file 56 and the accepted degradations file 58. The task model file 56 is part of the profiles 36 of the distributed applications layer 32. The task model file 56 is a previously generated file that assigns different models to each task in the task list. Each model is a collection of data, which could be derived experimentally or by computer aided software design techniques, which defines characteristics of the associated task, such as latency constraints, priority, data flows, initial energy estimate at a reference processor speed, impacts of degradations, and an execution profile on a given processor as a function of MIPs and time. The degradation list 58 sets forth the variety of degradations that can be used in generating the scenario.

Each time the task list is modified (i.e., a new task is created or a task is deleted) or when a real time event, occurs, based on the task list 52 and the task model 56 in step 54, a scenario is built. The scenario allocates the various tasks to the modules and provides priority information setting the priority with which tasks are executed. A scenario energy estimate 59 at a reference speed can be computed from the tasks' energy estimate. If necessary or desirable, tasks may be degraded; i.e., a mode of the task that uses fewer resources may be substituted for the full version of a task. From this scenario, an activities estimate is generated in block 60. The activities estimate uses task activity profiles 62 (from the profiling data 36 of the distributed application layer 32) and a hardware architectural mode 64 (also from the profiling data 36 of the distributed application layer 32) to generate probabilistic values for hardware activities that will result from the scenario. The probabilistic values include each module's wait/run time share (effective MHz), accesses to caches and memories, I/O toggling rates and DMA flow requests and data volume. Using a period T that matches the thermal time constant, from the energy estimate 59 at a reference processor speed and the average activities derived in step 60 (particularly, effective processors speeds), it is possible to compute an average power dissipation that will be compared to thermal package mode . If the power value exceeds any thresholds set forth in the package thermal model 72, the scenario is rejected in decision block 74. In this case, a new scenario is built in block 54 and steps 60, 66 and 70 are repeated. Otherwise, the scenario is used to execute the task list.

During operation of the tasks as defined by the scenario, the OS and RTOSs track activities by their respective modules in block 76 using counters 78 incorporated in the hardware. The actual activity in the modules of the multiprocessor system 10 may vary from the activities estimated in block 60. The data from the hardware counters are monitored on a T periodic basis to produce measured activity values. These measured activity values are used in block 66 to compute an energy value for this period, and hence, an average power value in block 66, as described above, and are compared to the package thermal model in block 72. If the measured values exceed thresholds, then a new scenario is built in block 54. By continuously monitoring the measured activity values, the scenarios can be modified dynamically to stay within predefined limits or to adjust to changing environmental conditions.

Total energy consumption over T for the chip is calculated as:

$$E = \int_T \sum_{modules} [\alpha \cdot Cpd \cdot f \cdot V_{dd}^2] \cdot dt \equiv \sum_{modules} \left[ \sum_T (\alpha \cdot) \right] \cdot Cpd \cdot f \cdot V_{dd}^2$$

where, f is the frequency, $V_{dd}$ is the supply voltage and $\alpha$ is the probabilistic (or measured, see discussion in connection with block 76 of this figure) activity. In other words, $$\sum_T (\alpha) * Cpd * f * V_{dd}^2$$

is the energy corresponding to a particular hardware module characterized by equivalent dissipation capacitance Cpd; counters values give $\Sigma_T (\alpha)$ and E is the sum of all energies for all modules in the multiprocessor system 10 dissipated within T. Average system power dissipation W=E/T. In the preferred embodiment, measured and probabilistic energy consumption is calculated and the average power dissipation is derived from the energy consumption over period T. In most cases, energy consumption information will be more readily available. However, it would also be possible to calculate the power dissipation from measured and probabilistic power consumption.

Figure 4B:
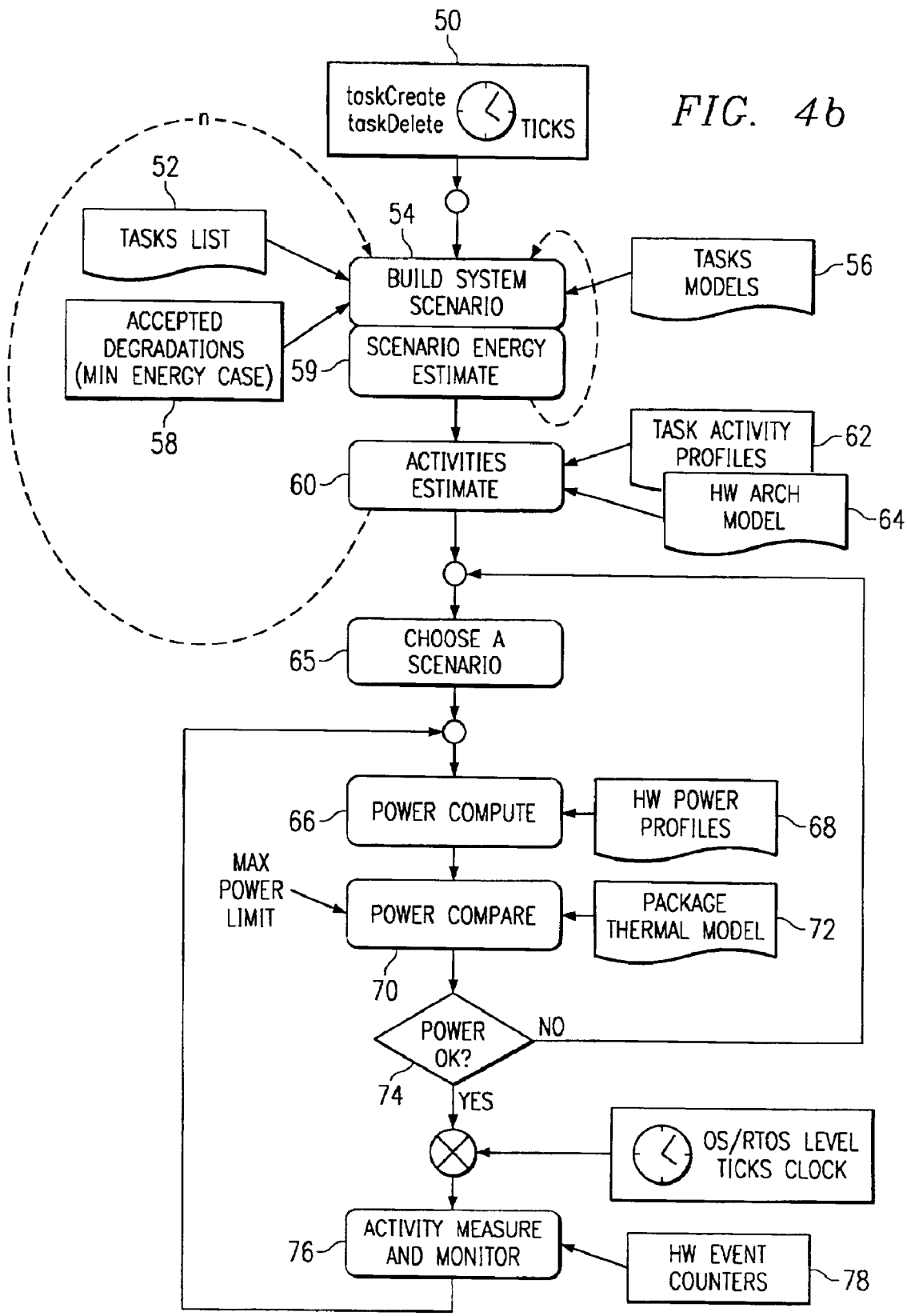

FIG. 4b is a flow chart describing operation of a second embodiment of the power management tasks 38. The flow of FIG. 4b is the same as that of FIG. 4a, except when the scenario construction algorithm is invoked (new task, task delete, real time event) in step 50, instead of choosing one new scenario, n different scenarios that match the performances constraints can be pre-computed in advance and stored in steps 54 and 59, in order to reduce the number of operations within the dynamic loop and provide faster adaptation if the power computed in the tracking loop leads to current scenario rejection in block 74. In FIG. 4b, if the scenario is rejected, another pre-computed scenario is selected in block 65. Otherwise the operation is the same as shown in FIG. 4a.

Figure 5:
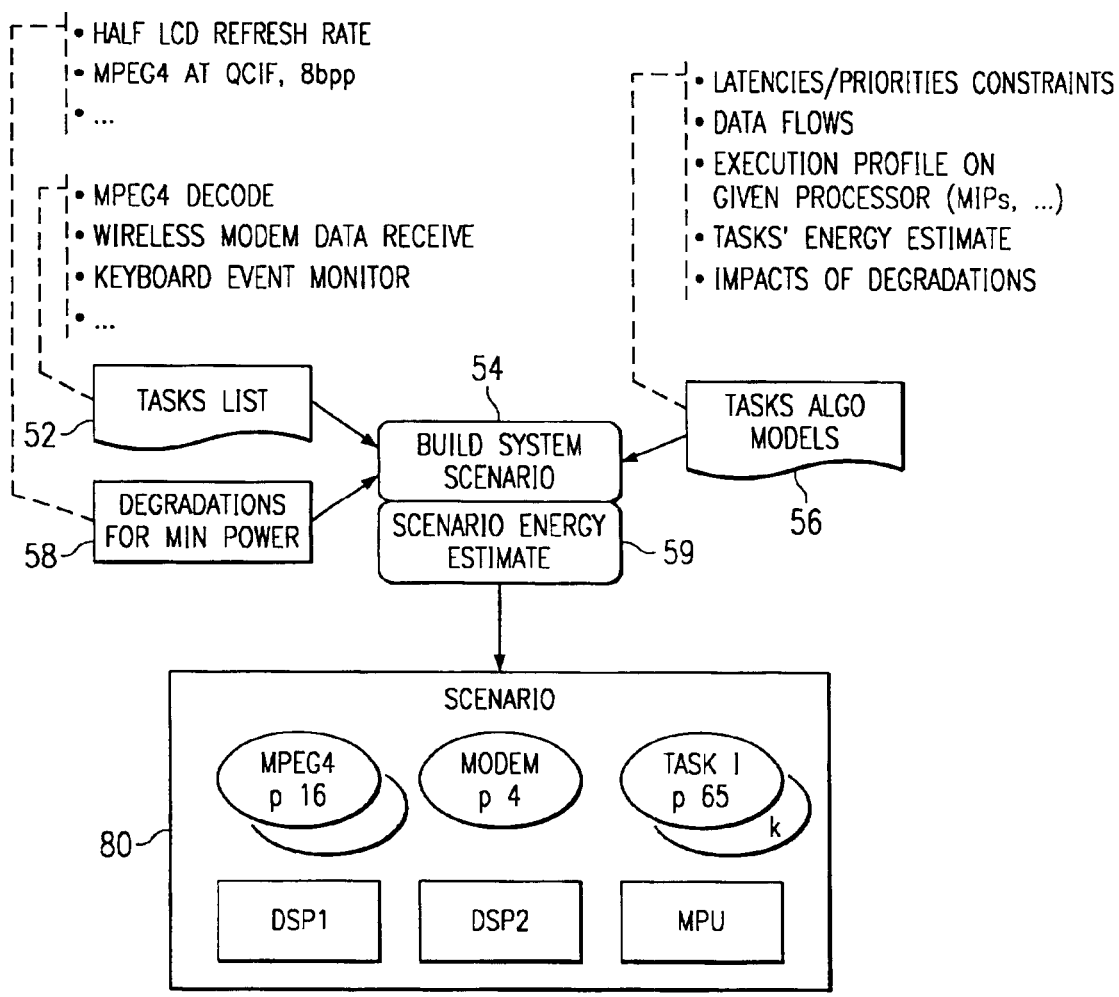
FIG. 5 illustrates the building system scenario block of FIG. 4.

FIGS. 5–8 illustrate the operation of various blocks of FIG. 3 in greater detail. The build system block 54 is shown in FIG. 5. In this block, a task list 52, a task model 56, and a list of possible task degradations 58 are used to generate a scenario. The task list is dependent upon which tasks are to be executed on the multiprocessor system 10. In the example of FIG. 5, three tasks are shown: MPEG4 decode, wireless modem data receive and keyboard event monitor. In an actual implementation, the tasks could come from any number of sources. The task model sets forth conditions which must be taken in consideration in defining the scenario, such as latency and priority constraints, data flow, initial energy estimates, and the impact of degradations. Other conditions could also be used in this block. The output of the build system scenario block is a scenario 80, which associates the various tasks with the modules and assigns priorities to each of the tasks. In the example shown in FIG. 5, for example, the MPEG4 decode task has a priority of 16 and the wireless modem task has a priority of 4.

The scenarios built in block 54 could be based on a number of different considerations. For example, the scenarios could be built based on providing the maximum performance within the packages thermal constraints. Alternatively, the scenarios could be based on using the lowest possible energy. The optimum scenario could change during operation of a device; for example, with fully charged batteries a device may operate at a maximum performance level. As the power in the batteries diminished below a preset level, the device could operate at the lowest possible power level to sustain operation.

Figure 6:
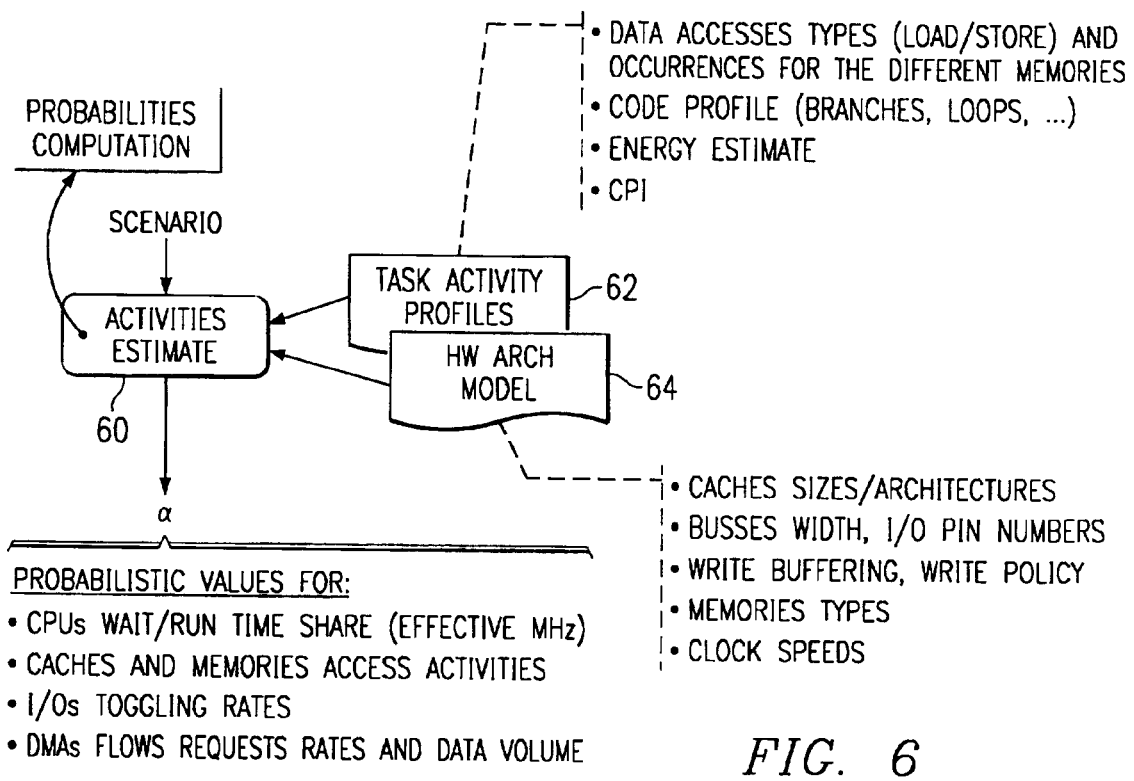
FIG. 6 illustrates the activities estimate block of FIG. 4.

The scenario 80 from block 54 is used by the activities estimate block 60, shown in FIG. 6. This block performs a probabilities computation for various parameters that affect power usage in the multiprocessor system 10. The probabilistic activities estimate is generated in conjunction with task activity profiles 62 and hardware architectural models 64. The task activity profiles include information on the data access types (load/store) and occurrences for the different memories, code profiles, such as the branches and loops used in the task, and the cycles per instruction for instructions in the task. The hardware architectural model 64 describes in some way the impact of the task activity profiles 62 on the system latencies, that will permit computation of estimated hardware activities (such as processor run/wait time share). This model takes into account the characteristics of the hardware on which the task will be implemented, for example, the sizes of the caches, the width of various buses, the number of I/O pins, whether the cache is write-through or write back, the types of memories used (dynamic, static, flash, and so on) and the clock speeds used in the module. Typically, the model can consist of a family of curves that represent MPU and DSP effective frequency variations with different parameters, such as data cacheable/non-cacheable, read/write access shares, number of cycles per instruction, and so on. In the illustrated embodiment of FIG. 6, values for the effective frequency of each module, the number of memory accesses, the I/O toggling rates and the DMA flow are calculated. Other factors that affect power could also be calculated.

Figure 7:
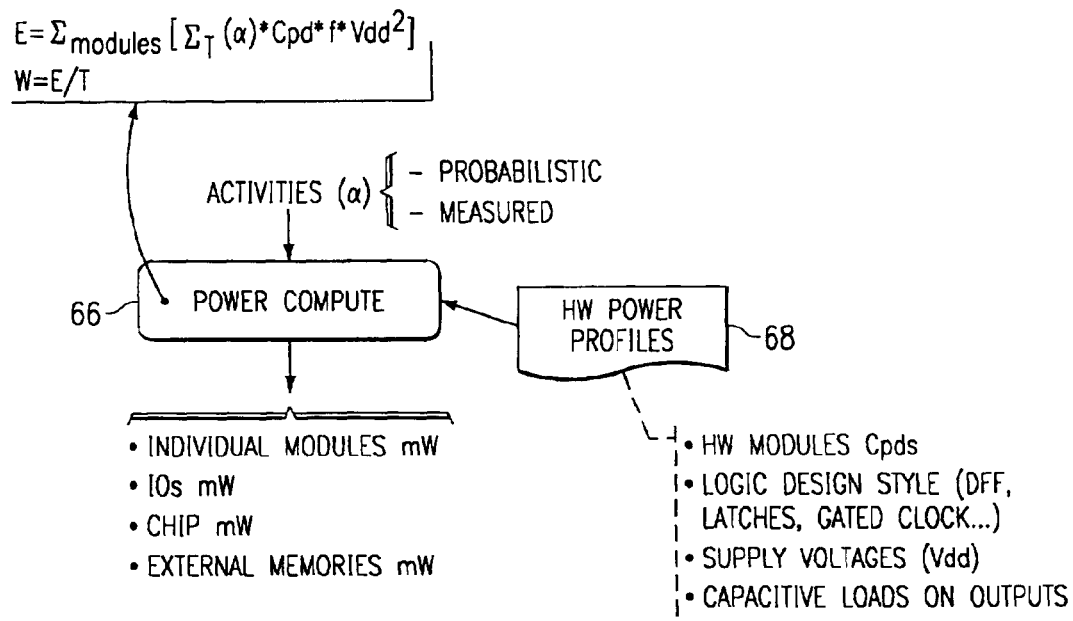
FIG. 7 illustrates the power compute block of FIG. 4.

The power compute block 66 is shown in FIG. 7. In this block, the probabilistic activities from block 60 or the measured activities from block 76 are used to compute various energy values and, hence, power values over a period T. The power values are computed in association with hardware power profiles, which are specific to the hardware design of the multiprocessor system 10. The hardware profiles could include a Cpd for each module, logic design style (D-type flip-flop, latches, gated clocks and so on), supply voltages and capacitive loads on the outputs. Power computations can be made for integrated modules, and also for external memory or other external devices.

Figure 8:
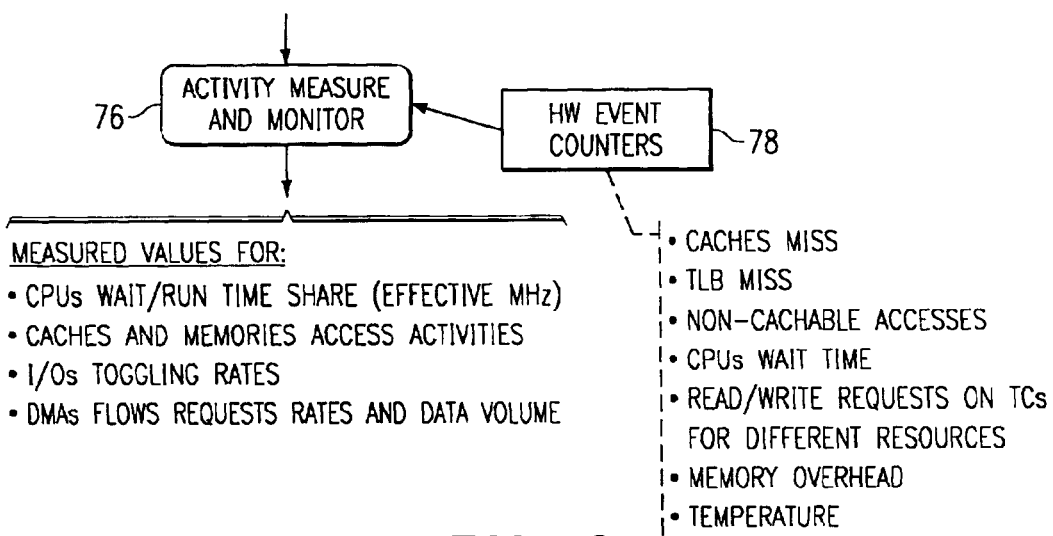
FIG. 8 illustrates the activity measure and monitor block of FIG. 4.

Activity measure and monitor block 76 is shown in FIG. 8. Counters are implemented throughout the multiprocessor system 10 to measure activities on the various modules, such as cache misses, TLB (translation lookaside buffer) misses, non-cacheable memory accesses, wait time, read/write requests for different resources, memory overhead and temperature. The activity measure and monitor block 76 outputs values for the effective frequency of each module, the number of memory accesses, the I/O toggling rates and the DMA flow. In a particular implementation, other values may also be measured. The output of this block is sent to the power compute block 66.

Figure 9:
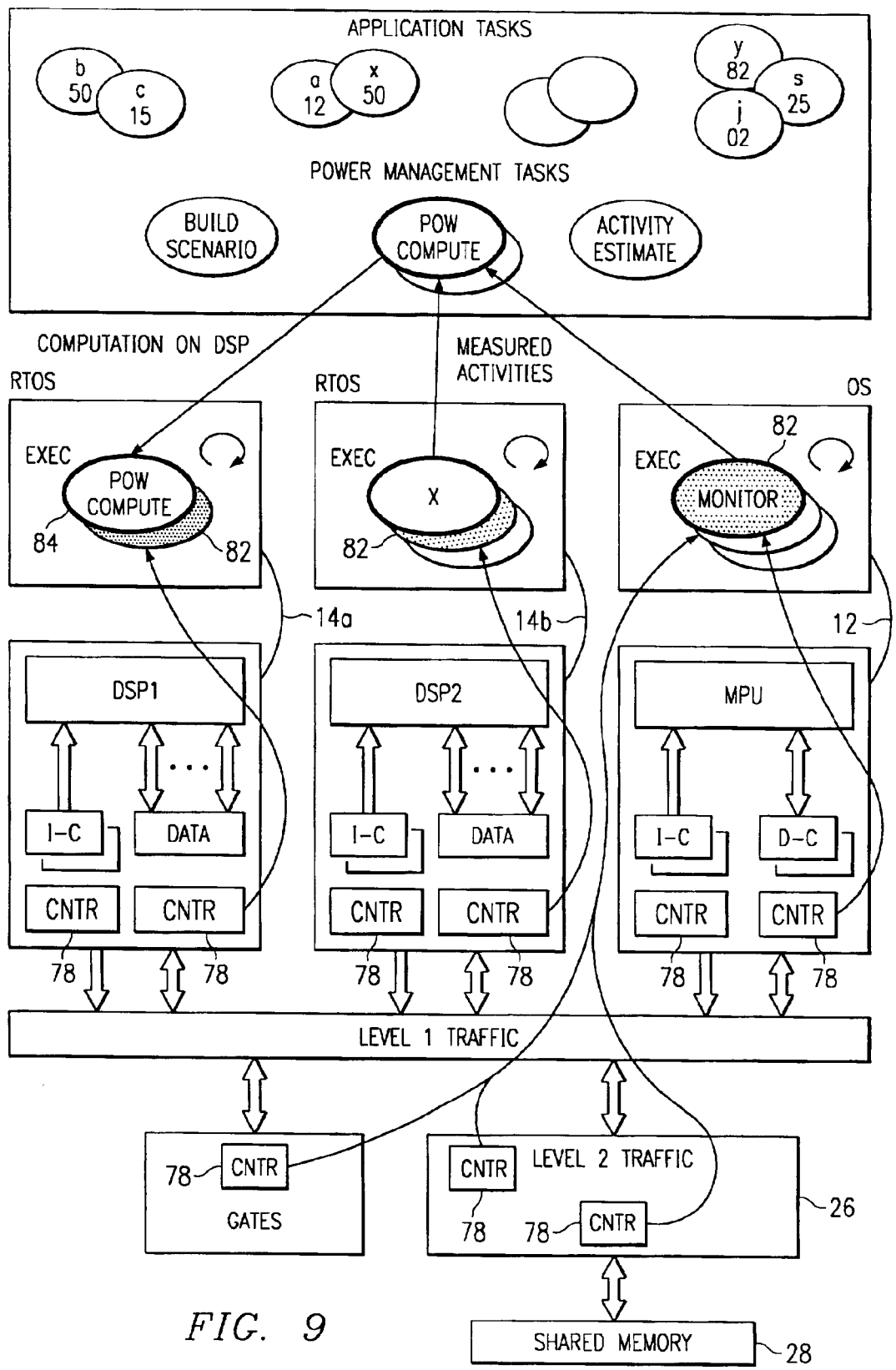
FIG. 9 illustrates a block diagram showing the multiprocessor system with activity counters.

FIG. 9 illustrates and example of a multiprocessor system 10 using power/energy management software. In this example, the multiprocessor system 10 includes a MPU 12, executing an OS, and two DSPs 14 (individually referenced as DSP1 14a and DSP2 14b), each executing a respective RTOS. Each module is executing a monitor task 82, which monitors the values in various activity counters 78 throughout the multiprocessor system 10. The power compute task 84 is executed on DSP 14a. The various monitor tasks retrieve data from associated activity counters 78 and pass the information to DSP 14a to calculate a power value based on measured activities. The power management tasks, such as power compute task 84 and monitor task 82, can be executed along with other application tasks.

In the preferred embodiment, the power management tasks 38 and profiles 36 (FIG. 2) are implemented as JAVA class packages in a JAVA real-time environment.

The embodiment shown above provides significant advantages over the prior art. First, it provides for a fully dynamic power management. As the tasks executed in the multiprocessor system 10 change, the power management can build new scenarios to ensure that thresholds are not exceeded. Further, as environmental conditions change, such as battery voltages dropping, the power management software can re-evaluate conditions and change scenarios, if necessary. For example, if the battery voltage (supply voltage) dropped to a point where Vdd could not be sustained at its nominal value, a lower frequency could be established, which would allow operation of the multiprocessor system 10 at a lower Vdd. New scenarios could be built which would take the lower frequency into account. In some instances, more degradations would be introduced to compensate for the lower frequency. However, the lower frequency could provide for continued operation of the device, despite supply voltages that would normally be insufficient. Further, in situations where a lower frequency was acceptable, the device could operate at a lower Vdd (with the availability of a switched mode supply) in order to conserve power during periods of relatively low activity.

The power management software is transparent to the various tasks that it controls. Thus, even if a particular task does not provide for any power management, the power management software assumes responsibility for executing the task in a manner that is consistent with the power capabilities of the multiprocessor system 10.

The overall operation of the power management software can be used with different hardware platforms, with different hardware and tasks accommodated by changing the profiles 36.

Figure 10:
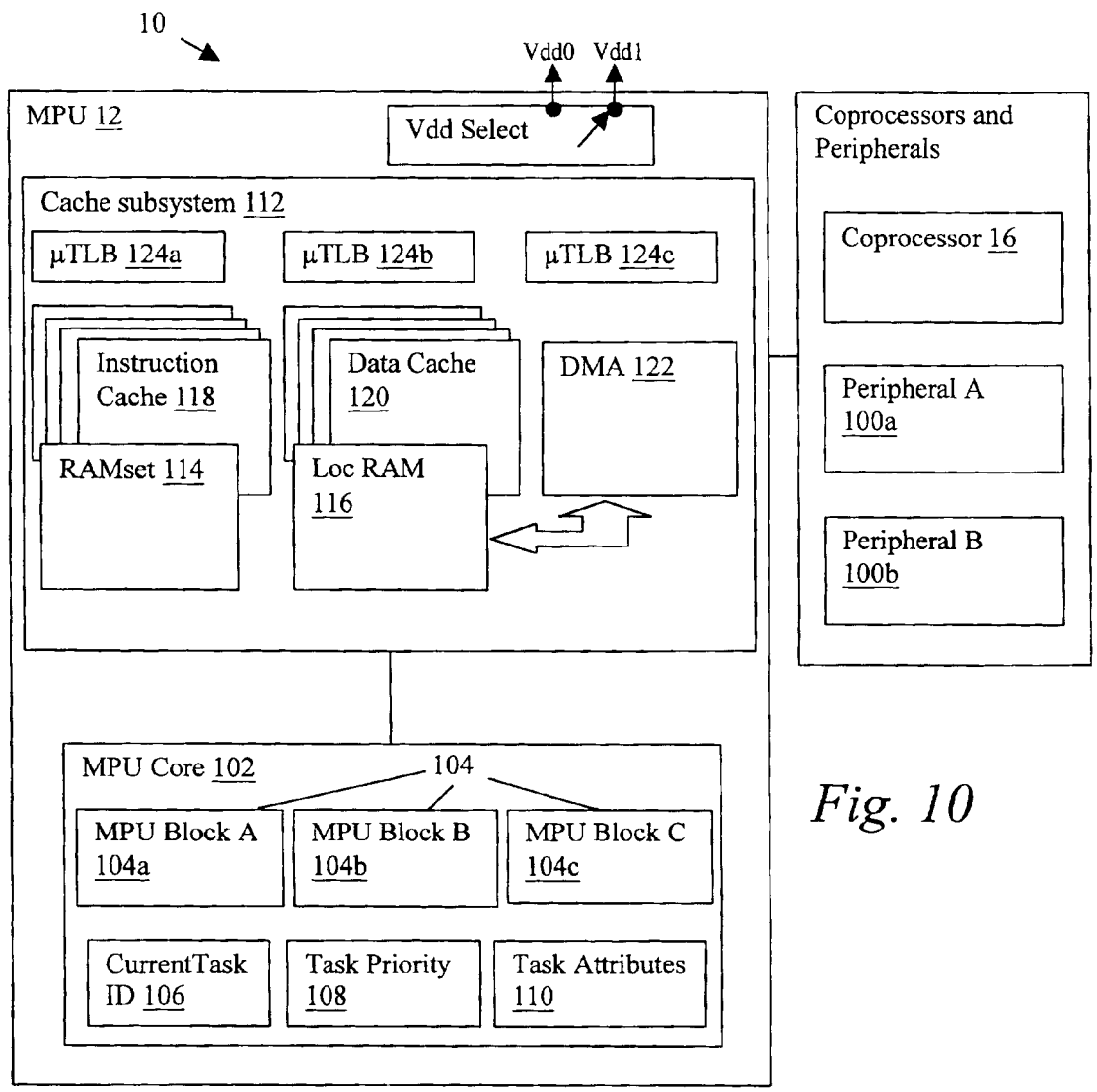
FIG. 10 illustrates a block diagram of a portion of a processing system showing a capability to manage power to various subcomponents.

FIG. 10 illustrates a portion of a processing system 10, showing a detailed block diagram of an autonomous processor (MPU 12), coupled to a coprocessor 16 along with other peripheral devices 100a and 100b. MPU 12 includes core circuitry 102, comprised of various core blocks 104a, 104b, and 104c. Core 102 further includes a Current Task ID register 106, a Task Priority register 108 and a Task Attributes register 110. Core 102 is coupled to a cache subsystem 112, including and instruction RAMset cache 114, a local RAM 116, an n-way instruction cache 18, an n-way data cache 120, a DMA (direct memory access) channel 122, and microTLB (translation lookaside buffer) caches 124a, 124b, and 124c. MPU 12 further includes voltage select circuitry 126 for selecting between two (or more) voltages to power the MPU 12.

The cache subsystem 112 shown in FIG. 10 has several different caching circuits. The microTLBs 124a–c are a small TLB structures that cache a few entries, used where a larger TLB (typically providing 64 entries or more) would penalize the speed of the processor. The n-way caches 118 and 120 can be of conventional design (or could be a direct mapped cache). A RAMset cache is designed to cache a contiguous block of memory starting from a chosen main memory address location. The RAMset cache 114 can be designed as part of the n-way cache; for example, a 3-way instruction cache 118 could be configured as one RAM set cache and a 2-way set associative cache. The particulars of the cache subsystem shown in FIG. 10 are provided only as an example; the cache subsystem could be varied by a circuit designer as desired.

For a given task, certain of the cache components may not be needed, or the cache components may be configured for optimal operation. For example, for a certain task, it may be desirable to configure a 4-way instruction cache as a RAMset cache 114 and a 3-way set associative cache, while the data cache 120 was configured as a direct mapping cache.

The voltage select circuitry 126 provides a supply voltage to the MPU 12. As is well known in the art, the voltage needed to support processing circuitry is dependent upon several factors; temperature and frequency are two of the more significant factors. For tasks where a high frequency is not needed, the voltage can be lowered to reduce energy consumption in the processing system 10.

One or more coprocessors and other peripheral devices may be used by the MPU 12 for various functions. The coprocessor 16 is used to provide high speed mathematical computations. Peripheral A 100a could be a input/output port, for example. Peripheral B could be a pointing device interface, such as a touch screen interface.

The MPU core 102 provides the processing function for MPU 12. This processing function is broken into multiple discrete blocks 104. Each block performs a function that may or may not be needed for a given task. For example, floating point arithmetic unit, a multiplier, auxiliary accumulator, saturated arithmetic unit, count-leading-zeros logic, and so on, could each be treated as a MPU Block 104.

The Current Task ID register 106 stores a unique identifier for the current task being executed on the MPU 12. Other autonomous processors would also have a Current Task ID register 106 and may be executing a task different from the current task executed by the MPU 12. The Task Priority register 108 associates a priority with the task. The Task Attributes register 110 stores a control word having fields which can enable/disable circuitry or configure circuitry to an optimum configuration.

Figure 11:
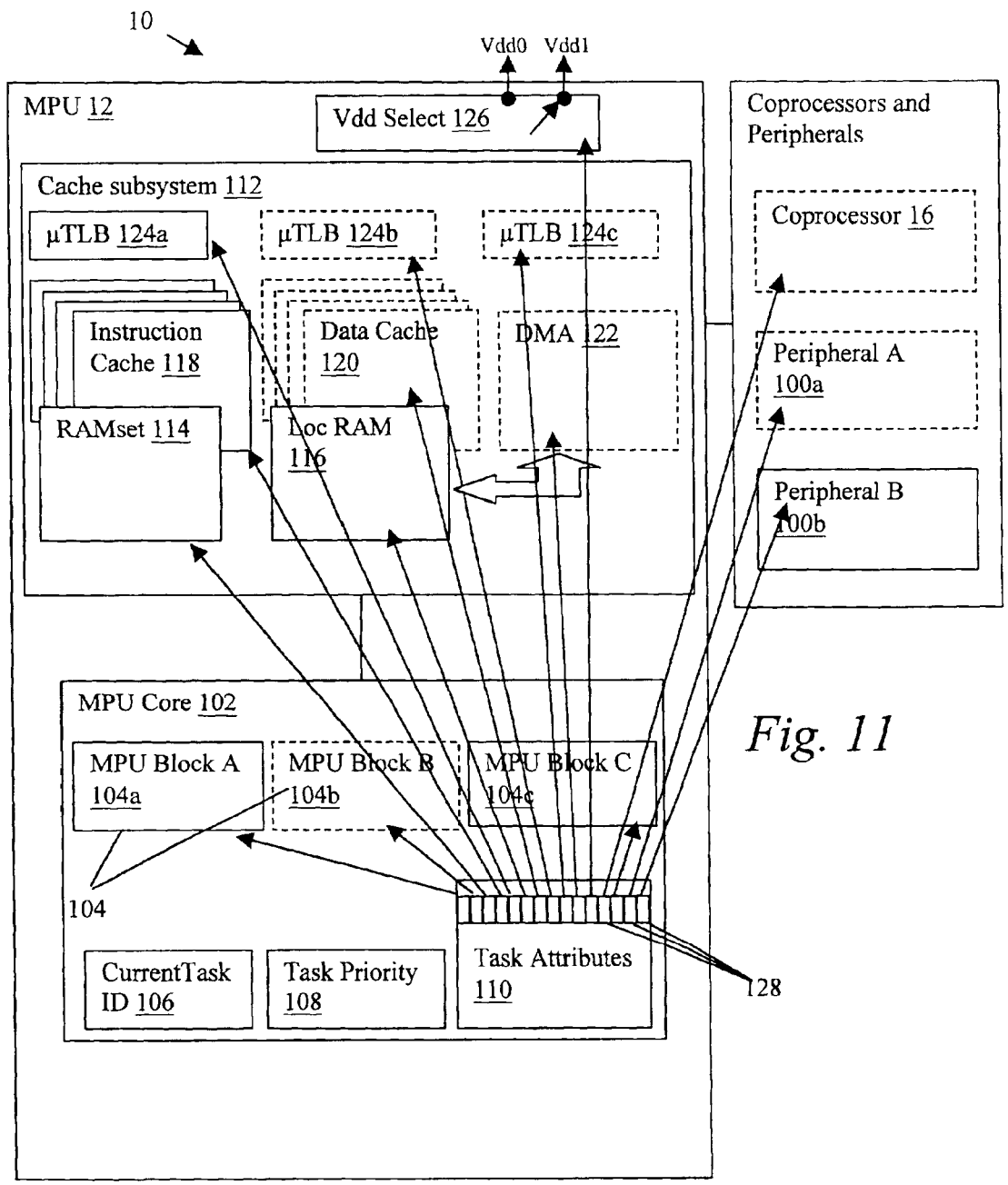
FIG. 11 illustrates the block diagram of FIG. 10 during execution of a task to disable circuitry not needed by the task.

The operation of the Task Attributes register 110 to enable or disable circuitry is shown in connection with FIG. 11. The data stored in the Task Attributes register 110 has multiple fields which map to associated devices. For a simple on/off attribute, the field could be a single bit. Multiple bit fields can be provided for other functions, such as choosing between three or four voltages in the voltage select circuit 126.

Each of the components shown in FIG. 11 as being mapped to the Task Attributes register 110 has circuitry that is responsive to a respective control field 128 in the register. For the voltage select circuit 126, one of multiple voltages is selected based on the value of the respective field 128. In FIG. 11, Vdd0 could be chosen if the field is a "0" and Vdd1 could be chosen if the field is a "1". For a voltage select circuit with four possible voltages, Vdd0 could be chosen if the field is a "00" and Vdd1 could be chosen if the field is a "01", Vdd2 could be chosen if the field is a "10" and Vdd 3 could be chosen if the field is a "11".

Coprocessor 16 is shown as disabled (power off), along with peripheral A 100a, while peripheral B 100b is shown as enabled. Each of these devices has an associated power switching circuit that supplies power to the component responsive to the value of the associated field in Task Attributes register 110. Disabling power to a component that is not used in a task can significantly reduce the overall power consumed by the processing system 10. Similarly, MPU block A 104a and MPU block C 104c are enabled, while MPU block B 104b is disabled.

In some cases, a hardware resource may be coupled to multiple autonomous processors. For example, a Level 2 shared memory may be coupled to both the MPU and the DSP. In cases where a hardware resource is shared between two or more autonomous processors, the resource can be coupled to the Task Attributes register 110 of each processor, and the subsystem can be enabled or disabled based on a logical operation on the associated bit values. For example, assuming that a bit value of "1" represented an "on" state for the hardware subsystem, a logical OR operation on the task attribute bits would enable the resource if either processor was executing a task that needed the resource.

Using the task attribute register as shown in FIG. 11 can significantly reduce the power consumed by the processing system 10 by disabling circuitry which is not used by a specific task.

Figure 12:
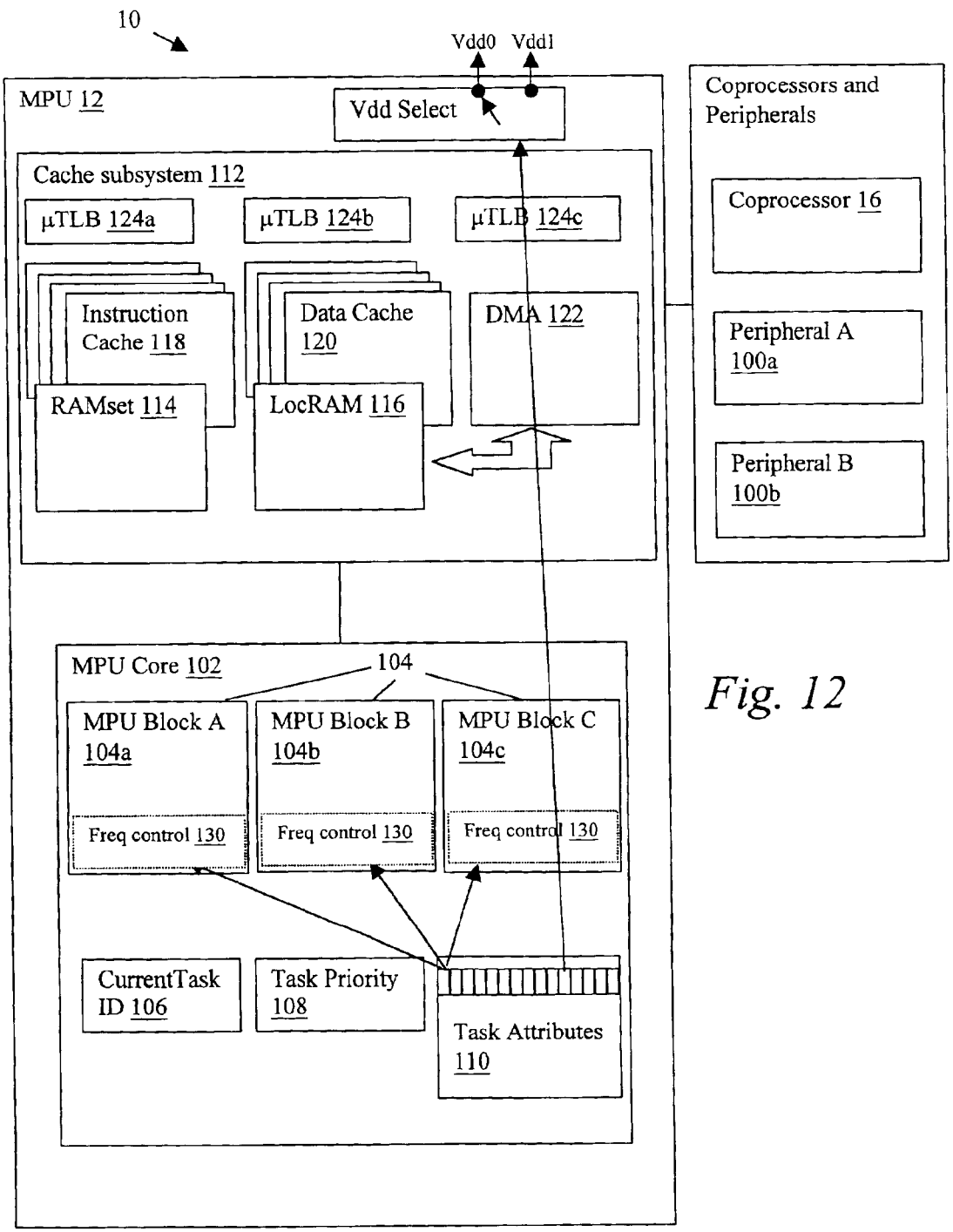
FIG. 12 illustrates the block diagram of FIG. 10 during execution of a task to configure certain circuits during operation of a task.

FIG. 12 illustrates a second scenario where the voltage to the MPU 12 is reduced. In FIG. 12, the Task Attributes register 110 provides voltage Vdd0 to MPU 12. It is assumed that Vdd0<Vdd1. To compensate for the reduction in supply voltage, the Task Attributes register 110 also configures the MPU blocks 104 to operate a lower frequency. Other subsystems in the MPU 12 may also be switched to a lower frequency due to the lower supply voltage.

This aspect of the invention can significantly reduce power consumption where a processing element can perform a task at a frequency lower than its maximum frequency.

Figure 13A:
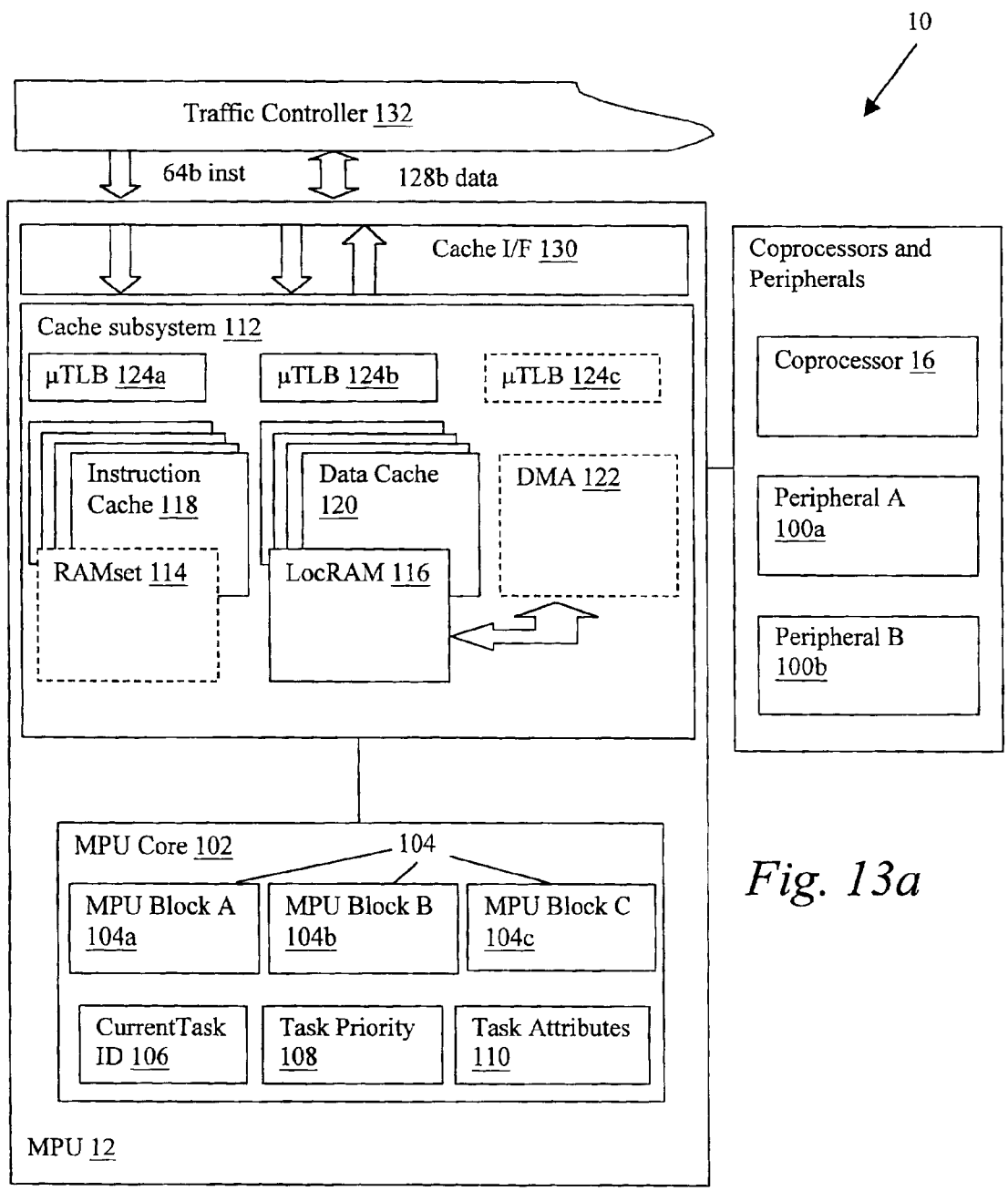
FIGS. 13a and 13b illustrate the configuration of a processing device to optimize the data bandwidth to the processing device.
Figure 13B:
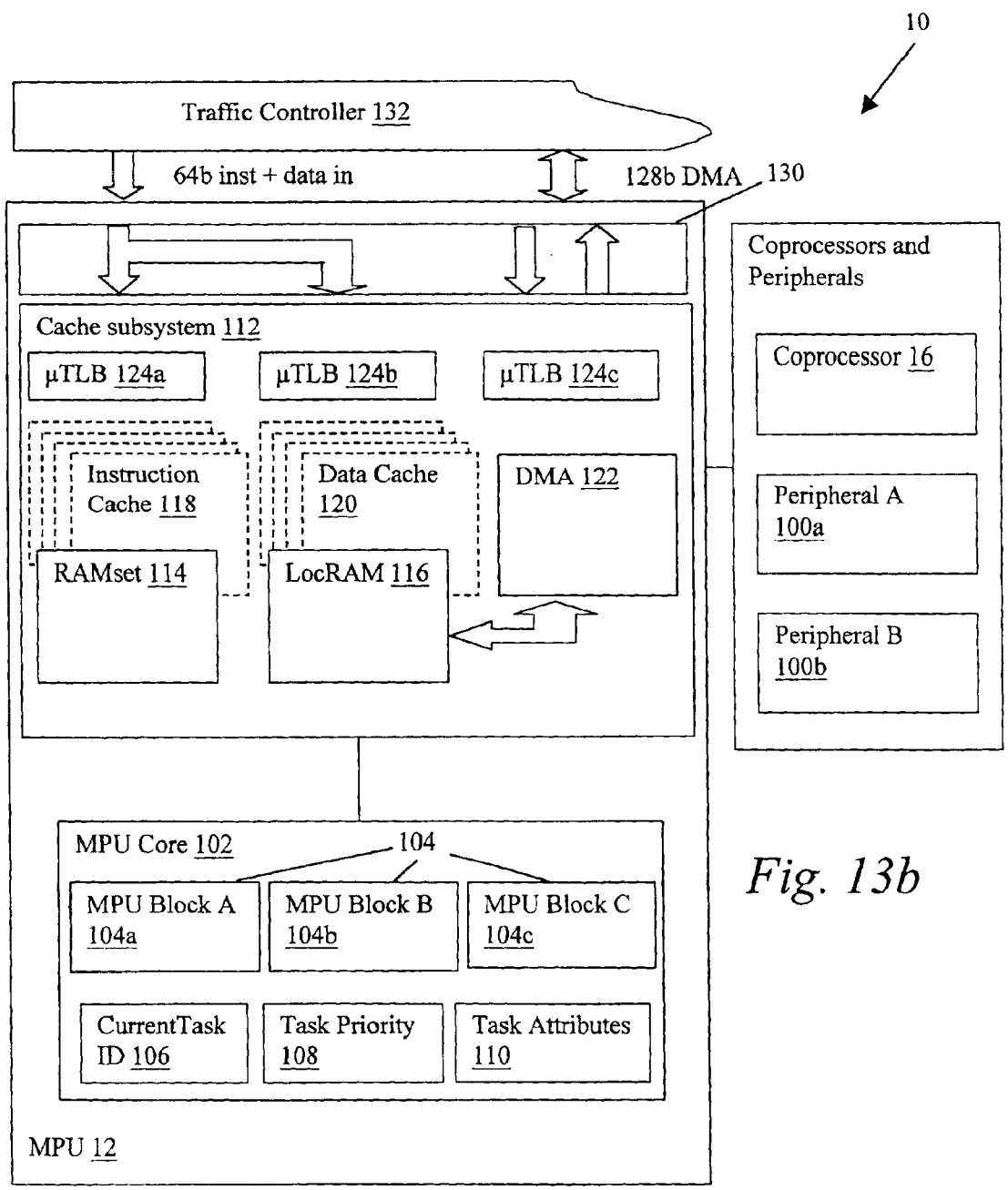

FIGS. 13a and 13b illustrate the use of the Task Attributes register 110 to alter the configuration of the processing device 10 for more efficient operation. In this embodiment, the MPU Core 102 and Cache subsystem 112 are substantially the same as shown in FIGS. 10–12. A cache interface 130 couples the cache subsystem 112 to a traffic controller 132. Traffic controller 132 and cache interface 130 control the flow of traffic between the system buses and the components of the cache subsystem 112.

Importantly, cache interface 130 and traffic controller 132 are designed such that the bandwidth to components in the cache subsystem can be varied as desired. For example, FIG. 13a illustrates a configuration where the currently executed task is computation intensive. In this configuration, the Task Attributes register 110 is set to provide a 64-bit instruction path to the instruction cache 118 and the microTLB register 124a and a 128-bit bi-directional path to the microTLB 124b, data cache 120 and local RAM 116. MicroTLB 124c, DMA 122 and RAMset cache 114 are turned off.

In FIG. 13b, a new task is being executed resulting in a change in the task attribute register. The task shown in FIG. 13b allocates high bandwidth to DMA transfer management, and a lower bandwidth for data and instruction transfers. Accordingly, a 64-bit input bus is shared between the microTLB 124a/RAMset 114 instruction caches and the microTLB 124b/local RAM 116 data caches. The 128-bit bi-directional bus is coupled to microTLB 124c and DMA circuit 122.

In addition to the bus configuration set by the cache interface 130 and traffic controller 132, the Task Attributes register 110 could also configure the cache architecture. In FIG. 13b, cache resources can be allocated between the instruction cache 118 and RAMset cache 114. For example, the cache resources could be allocated as a 3-way set associative cache with a RAMset cache 114, a 2-way set associative cache with a larger RAMset cache, a 4-way set associative cache with no RAMset cache (as shown) or as a direct mapped cache with or without a RAMset cache 114. Depending upon the task (or scenario), the most efficient cache architecture could be chosen. Other hardware could be configured for maximum efficiency as well.

Figure 14:
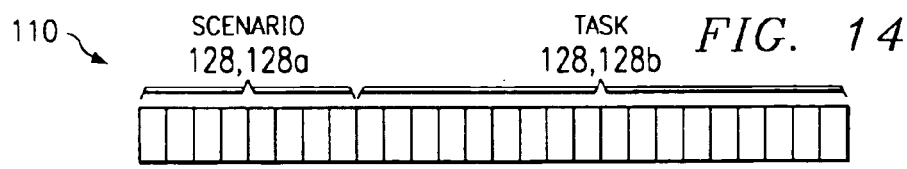
FIG. 14 illustrates the organization of a task attributes control word.

As shown in FIG. 14, some fields 128 in the Task Attributes register 110 may configure the processing device 10 for a given scenario while others configure the device 10 for on each task. Scenario specific attribute fields 128a remain the same while tasks are switched. For example, certain attributes, such as the core voltage to the processing device 10 or a system DMA controller, may be set for a scenario including several tasks which are being simultaneously executed by one or more processors. When the scenario changes, for example when a new task is executed or when of the current tasks is terminated, a new scenario is created, and the scenario specific attributes may change.

The task specific attribute fields 128b of Task Attributes register 110, on the other hand, may switch during multitasking of several tasks in a scenario. Each time a task becomes the active task in a processing element of the processing system 10, the attribute fields of that task overwrite the task specific attribute fields of the previous active task (scenario specific attribute fields 128a unchanged).

The task attribute fields for a given scenario and for each task in the scenario can be generated by the global tasks scheduler 40 based on the task list 52 and associated profiles 36, as shown in FIGS. 4a and 4b. The energy savings provided by the ability to enable/disable hardware and to configure hardware for optimum performance are taken into account in generating the scenario. An attribute word is computed for each task and stored as part of the task's context information. Upon a context switch, the attribute word for the active task is loaded into the Task Attributes register 110. The Current Task ID register 106 and Task Priority register 108 are also loaded at this time.

Figure 15:
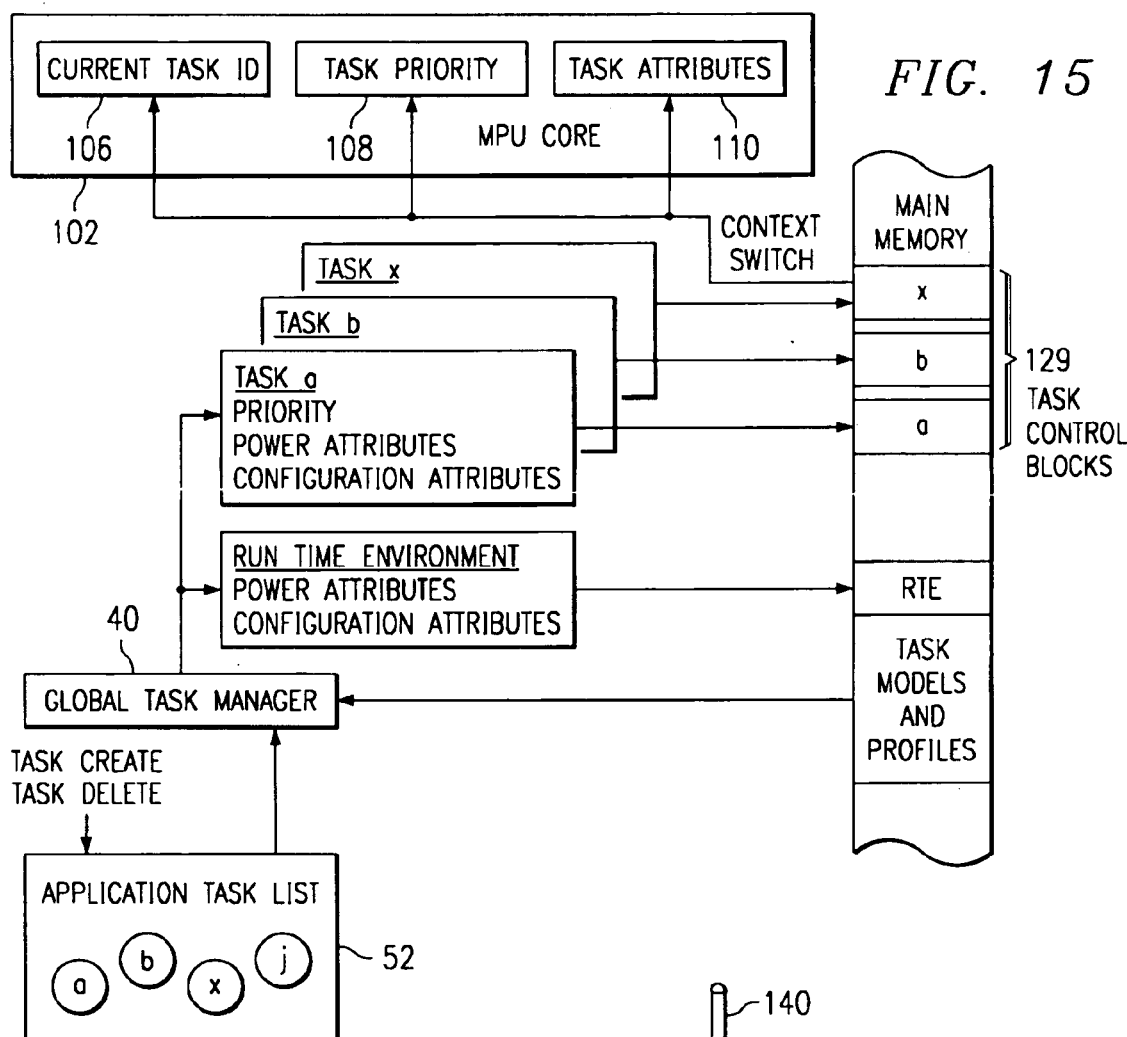
FIG. 15 illustrates a functional depictions of the loading of the task attribute register (and other registers) in connection with a context switch.

FIG. 15 illustrates a function diagram showing the creation of the data used for the Task Attributes register 110. Upon the creation or deletion of a task, the global task scheduler 40 builds a scenario based on the task list 52 and associated models and profiles. Using this information, power and configuration attributes are computed for the run-time environment (the scenario attributes 128a) and also computes the priority information and the power and configuration attributes for the individual tasks in the scenario. For each task, the priority and attributes are stored in a respective task control block 129. Upon a context switch, where tasks are changed for a given processor, the information in the task control block for the new task are loaded into the appropriate registers. Task control blocks 129 may also contain other state information for the task that is restored upon the context switch.

Figure 16:
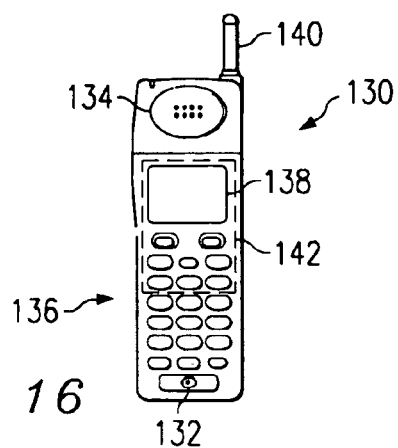
FIG. 16 illustrates a mobile communications device using processing circuitry including the invention.

FIG. 16 illustrates an implementation of a mobile communications device 130 with microphone 132, speaker 134, keypad 136, display 138 and antenna 140. Internal processing circuitry 142 includes one or more processing devices with the energy saving features described herein. It is contemplated, of course, that many other types of communications systems and computer systems may also benefit from the present invention, particularly those relying on battery power. Examples of such other computer systems include personal digital assistants (PDAS), portable computers, personal digital assistants (PDAs), smart phones, web phones, and the like. As power dissipation is also of concern in desktop and line-powered computer systems and micro-controller applications, particularly from a reliability standpoint, it is also contemplated that the present invention may also provide benefits to such line-powered systems.

Telecommunications device 130 includes microphone 132 for receiving audio input, and speaker 134 for outputting audible output, in the conventional manner. Microphone 132 and speaker 134 are connected to processing circuitry 142, which receives and transmits audio and data signals.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A processing device comprising:
   a processing module capable of multitasking multiple tasks;
   one or more associated circuits, coupled to said processing module for supporting the processing module, each of said associated circuits having power circuitry for either enabling or disabling the associated circuit responsive to a power input, at least one of the associated circuits being used by more than one task;
   a task attribute register storing task attribute bits for enabling and disabling the associated circuits, wherein each task has task attribute bits associated therewith which are stored in the task attribute register while the task is being executed by the processing module; and
   a logical OR gate having inputs receiving a bit of each the task attribute register corresponding to the at least one associated circuit used by more than one task and an output connected to the power input of the associated circuit used by more than one task to enable the associated circuit used by more than one task when task using the associated circuit is being executed by the processing module and to disable the associated circuit used by more than one task when no task using the associated circuit is being executed by the processing module.

2. The processing device of claim 1 wherein said processing module is a microprocessor module.

3. The processing device of claim 1 wherein said processing module is a digital signal processor.

4. The processing device of claim 1 wherein at least one of said associated circuits is a caching circuit.

5. The processing device of claim 1 wherein one of said associated circuits is a coprocessor.

6. The processing device of claim 1 wherein said processing module comprises a first processing module, and further comprising one or more additional processing modules.

7. A method of operating a processing device including a processing module capable of multitasking multiple tasks coupled to one or more associated circuits, at least one of the associated circuits being used by more than one task, comprising the steps of:
   identifying each of a plurality of current tasks; and
   storing task attribute bits associated with currently executing task in a task attribute register; and
   selectively enabling or disabling power to the associated circuits during execution of said current task responsive to said task attribute bits stored in said task attribute register; and
   logical ORing task attribute bits of said more than one task corresponding to said at least one associated circuit used by more than one task to enable said associated circuit used by more than one task when any task using said associated circuit is being executed by the processing module and to disable said associated circuit when no task using said associated circuit is being executed by the processing module.

8. The method of claim 7 wherein said processing module is a microprocessor module.

9. The method of claim 7 wherein said processing module is a digital signal processor.

10. The method of claim 7 wherein at last one of said associated circuits is a caching circuit.

11. The method of claim 7 wherein one of said associated circuits is a coprocessor.

12. The method of claim 7 wherein said processing module comprises a first processing module, and further comprising one or more additional processing modules.

* * * * *